US008462466B2

(12) United States Patent
Huber

(10) Patent No.: US 8,462,466 B2
(45) Date of Patent: Jun. 11, 2013

(54) DISK DRIVE COMPRISING IMPEDANCE DISCONTINUITY COMPENSATION FOR INTERCONNECT TRANSMISSION LINES

(75) Inventor: William D. Huber, Hollister, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 339 days.

(21) Appl. No.: 12/551,425

(22) Filed: Aug. 31, 2009

(65) Prior Publication Data

US 2011/0051292 A1    Mar. 3, 2011

(51) Int. Cl.
*G11B 5/48* (2006.01)
(52) U.S. Cl.
USPC ............... 360/246; 360/245.9; 360/264.2
(58) Field of Classification Search
USPC ............ 360/245.8, 245.9, 246, 266.3, 264.2, 360/234.5
See application file for complete search history.

(56) References Cited

U.S. PATENT DOCUMENTS

| | | |
|---|---|---|
| 3,617,952 A | 11/1971 | Beech |
| 4,344,093 A | 8/1982 | Huber |
| 4,656,533 A | 4/1987 | Sakai et al. |
| 5,184,095 A | 2/1993 | Hanz et al. |
| 5,608,591 A | 3/1997 | Klaassen |
| 5,717,547 A | 2/1998 | Young |
| 5,737,152 A | 4/1998 | Balakrishnan |
| 5,771,568 A | 6/1998 | Gustafson |
| 5,796,552 A | 8/1998 | Akin, Jr. et al. |
| 5,805,382 A | 9/1998 | Lee et al. |
| 5,995,328 A | 11/1999 | Balakrishnan |
| 6,144,981 A | 11/2000 | Kovacs et al. |
| 6,249,404 B1 | 6/2001 | Doundakov et al. |
| 6,275,358 B1 | 8/2001 | Balakrishnan et al. |
| 6,331,919 B1 | 12/2001 | Klaassen et al. |
| 6,356,113 B1 | 3/2002 | Contreras et al. |
| 6,424,500 B1 | 7/2002 | Coon et al. |
| 6,493,190 B1 | 12/2002 | Coon |
| 6,603,623 B1 | 8/2003 | Fontana, Jr. et al. |
| 6,608,736 B1 | 8/2003 | Klaassen et al. |
| 6,714,385 B1 | 3/2004 | Even et al. |
| 6,762,913 B1 | 7/2004 | Even et al. |
| 6,891,700 B2 | 5/2005 | Shiraishi et al. |
| 6,900,967 B1 | 5/2005 | Coon et al. |
| 6,963,471 B2 * | 11/2005 | Arai et al. ................. 360/246 |
| 6,975,488 B1 | 12/2005 | Kulangara et al. |
| 7,019,959 B2 * | 3/2006 | Chua ........................ 361/329 |
| 7,092,215 B2 | 8/2006 | Someya et al. |
| 7,142,073 B2 | 11/2006 | Kim et al. |
| 7,180,011 B1 | 2/2007 | Hall et al. |

(Continued)

OTHER PUBLICATIONS

Matthaei et al. "Multiplexer Design", Microwave Filters, Impedance-Matching Networks, and Coupling Structures. Artech House Books, 1980. Ch.16.
Huber et al., "Advanced Interconnect Design for High Data Rate Perpendicular Magnetic Recording", IEEE Transactions on Magnetics, vol. 44, No. 1, pp. 175-180, Jan. 2008.

(Continued)

*Primary Examiner* — Jefferson Evans

(57) ABSTRACT

A disk drive comprising a disk, and a head actuated over the disk, the head comprising a read element and a write element. The disk drive further comprises a preamp and an interconnect comprising a first transmission line and a second transmission line coupling the head to the preamp. A compensation network is disclosed operable to compensate for an impedance discontinuity in the first and second transmission lines, the compensation network comprising a first trace and a second trace connected in parallel with the first and second transmission lines, wherein a shape of the first and second traces varies to form at least a first capacitor.

23 Claims, 4 Drawing Sheets

U.S. PATENT DOCUMENTS

| | | | |
|---|---|---|---|
| 7,986,495 B2 * | 7/2011 | Kamei et al. | 360/246 |
| 8,289,656 B1 | 10/2012 | Huber | |
| 2004/0252413 A1 | 12/2004 | Nishiyama | |
| 2005/0180053 A1 * | 8/2005 | Dovek et al. | 360/246 |
| 2005/0280944 A1 | 12/2005 | Yang et al. | |
| 2006/0044695 A1 | 3/2006 | Erpelding | |
| 2006/0092572 A1 * | 5/2006 | Kiyono | 360/245.9 |
| 2006/0152854 A1 | 7/2006 | Arya et al. | |
| 2007/0178766 A1 | 8/2007 | Banerjee et al. | |
| 2008/0055788 A1 | 3/2008 | Nagai | |
| 2008/0273269 A1 | 11/2008 | Pro | |
| 2010/0157457 A1 * | 6/2010 | Contreras et al. | 360/39 |

OTHER PUBLICATIONS

Yue Ping Zhang et al., "Dual-Band Microstrip Bandpass Filter Using Stepped-Impedance Resonators With New Coupling Schemes", IEEE Transactions on Microwave Theory and Techniques, vol. 54, No. 10, pp. 3779-3785, Oct. 2006.

Klaassen et al., "Writing At High Data Rates", Journal of Applied Physics, vol. 93, No. 10, pp. 6450-6452, May 2003.

Scanlan et al. "Microwave Allpass Networks—Part I, Part II", IEEE Transactions on Microwave Theory and Techniques, vol. 16, No. 2, Feb. 1968, p. 62-79.

* cited by examiner

DISK DRIVE COMPRISING IMPEDANCE DISCONTINUITY COMPENSATION FOR INTERCONNECT TRANSMISSION LINES

BACKGROUND

The head in a disk drive is typically mounted on a slider attached to the end of a suspension. The suspension is attached to a distal end of an actuator arm which is rotated about a pivot by a voice coil motor (VCM) in order to actuate the head radially over the disk. The suspension is fabricated with traces (e.g., copper traces) which act as transmission lines that carry the write/read signals between the head and a preamp. It is important to fabricate the traces so as to optimize the signal-to-noise ratio of the write/read signals.

DETAILED DESCRIPTION OF EMBODIMENTS OF THE INVENTION

Figure 1A:
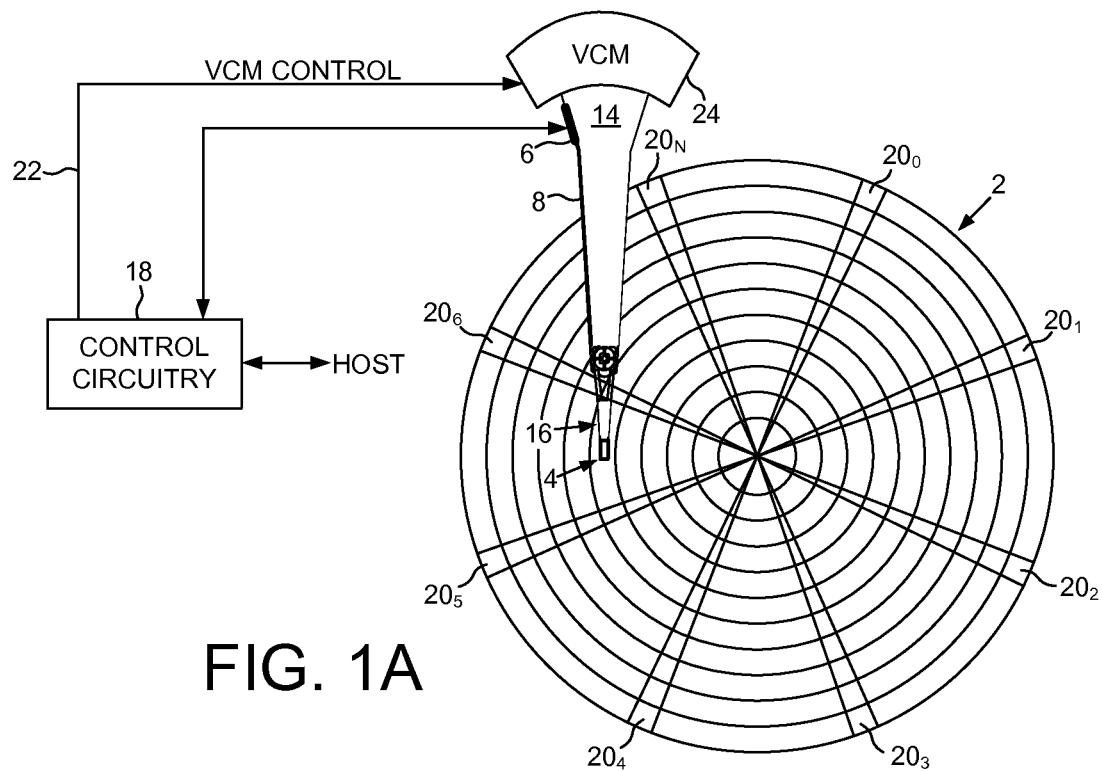
FIG. 1A shows a disk drive according to an embodiment of the present invention comprising a head actuated over a disk, a preamp, and control circuitry for performing write/read operations.

FIG. 1A shows a disk drive according to an embodiment of the present invention comprising a disk 2, and a head 4 actuated over the disk 2, the head 4 comprising a read element and a write element. The disk drive further comprises a preamp 6 and an interconnect 8 (FIG. 1B) comprising a first transmission line 10A and a second transmission line 10B coupling the head 4 to the preamp 6. A compensation network such as shown in FIG. 2A is operable to compensate for an impedance discontinuity in the first and second transmission lines, wherein the compensation network comprises a first trace and a second trace connected in parallel with the first and second transmission lines 10A and 10B. A shape of the first and second traces of the compensation network varies to form at least a first capacitor.

Figure 1B:
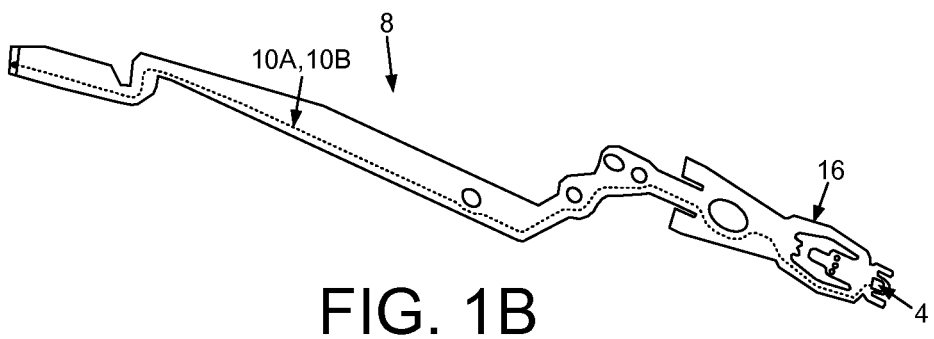
FIG. 1B shows an interconnect according to an embodiment of the present invention comprising first and second transmission lines for coupling the head to the preamp.
Figure 2A:
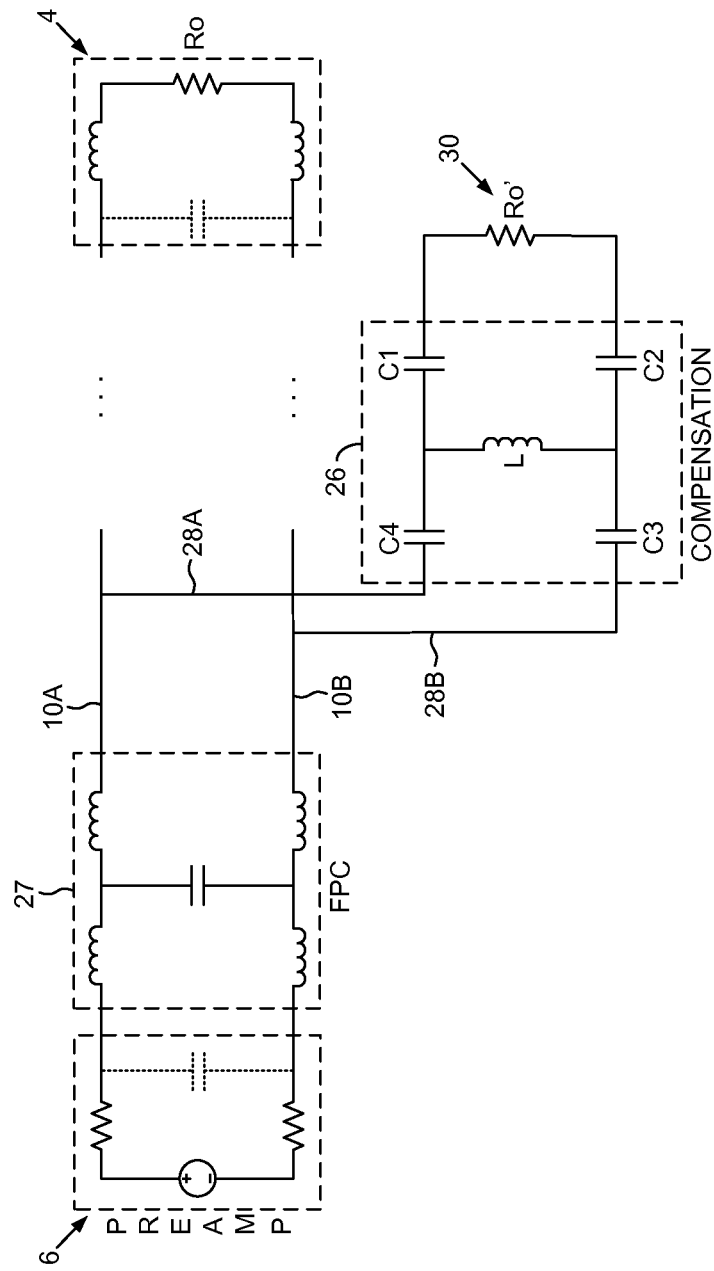
FIG. 2A shows a compensation network connected in parallel with the transmission lines of the interconnect according to an embodiment of the present invention.

In the embodiment of FIGS. 1A and 1B, the head 4 is coupled to a distal end of an actuator arm 14 by a suspension 16 that biases the head 4 toward the surface of the disk 2. As the disk 2 spins, an air bearing forms between the head 4 and disk surface such that the head 4 is said to "fly" over the disk surface. Control circuitry 18 generates a write signal applied to the head 4 through the preamp 6 during write operations, and during read operations demodulates a read signal emanating from the head 4 through the preamp 6. The control circuitry 18 may demodulate embedded servo sectors $20_0$-$20_N$ recorded around the circumference of the disk 2 in order to generate a VCM control signal 22 applied to a voice coil motor (VCM) 24 which rotates the actuator arm 14 about a pivot in order to position the head 4 radially over the disk 2.

Any suitable head 4 may be employed in the embodiments of the present invention, such as a head 4 comprising an inductive write element and a magnetoresistive (MR) read element. A write operation is performed by modulating a write current emanating from the preamp 6 and passing through the transmission lines 10A and 10B and through the inductive write element in order to write magnetic transitions onto the disk surface. During a read operation, the read element senses the magnetic transitions to generate a read signal carried by transmission lines 10A and 10B to the preamp 6. Either or both of the write transmission lines and read transmission lines may connect to a compensation network 26 according to different embodiments of the present invention.

FIG. 2A shows an embodiment of the present invention wherein the transmission lines 10A and 10B of the interconnect are bonded to the preamp 6 using a flexible printed circuit (FPC) 27. The FPC 27 exhibits an impedance discontinuity represented by an inductor/capacitor network shown in FIG. 2A. To compensate for this impedance discontinuity, a compensation network 26 comprising a capacitor/inductor network is connected in parallel with the transmission lines 10A and 10B of the interconnect. In the embodiment of FIG. 2A, the compensation network 26 comprises a first trace 28A connected to the first transmission line 10A, and a second trace 28B connected to the second transmission line.

In the embodiment of FIG. 2A, the compensation network 26 comprises a terminating load 30 (e.g., a resistor) which approximates the load of the read element or the write element of the head 4 depending on the embodiment. In the embodiment of FIG. 2A, the compensation network comprises four capacitors and an inductor, whereas other embodiments described below may comprise fewer capacitors, or even a single capacitor. The number of capacitor/inductor networks included in the compensation network 26 may vary depending on the desired performance versus cost of fabrication.

Figure 2B:
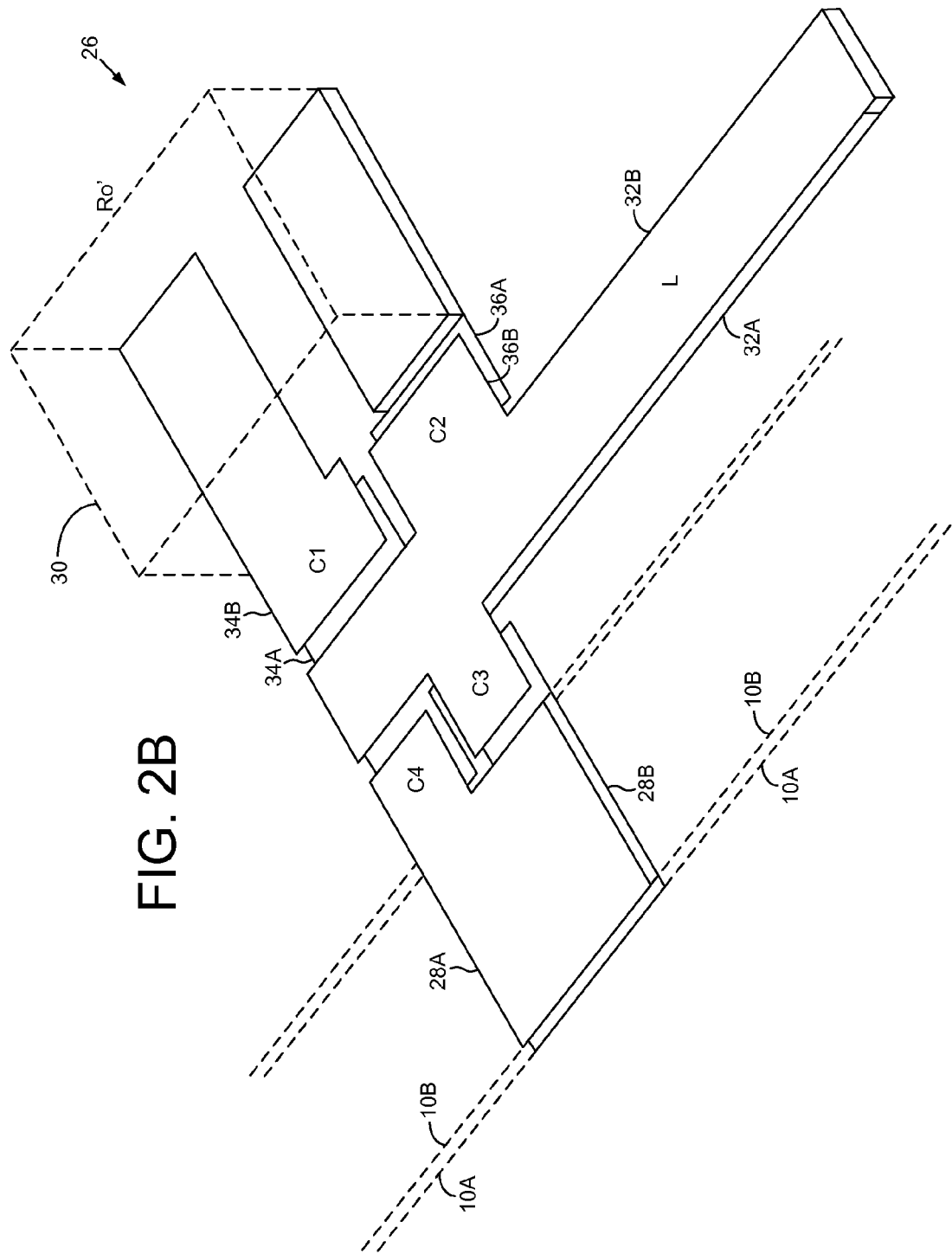
FIG. 2B shows an embodiment of the present invention wherein traces of the compensation network vary in shape to form the capacitors and inductors in the compensation network of FIG. 2A.

FIG. 2B shows an embodiment of the present invention wherein the traces 28A and 28B of the compensation network 26 vary in shape to form the capacitors and inductors in the compensation network of FIG. 2A. Also in the embodiment of FIG. 2B the traces 28A and 28B comprise any suitable conductive material, such as copper and may be fabricated using a broadside coupled stacked trace configuration having a suitable dielectric (e.g., a suitable plastic) between the traces 28A and 28B. Any suitable technique may be used to fabricate the stacked trace transmission lines 28A and 28B such as with a suitable etching technique. In an alternative embodiment, the traces 28A and 28B of the compensation network may be fabricated in a side-by-side configuration.

In the embodiment of FIG. 2B, the shape of the traces 28A and 28B that varies to form the capacitors and inductor elements of the compensation network 26 is the width of the traces 28A and 28B which varies symmetrically. Referring to FIG. 2B, the first trace 28A comprises a first segment 32A and the second trace 28B comprises a second segment 32B which form the inductor element L of FIG. 2A. The first trace 28A further comprises a third segment 34A and a fourth segment 34B symmetric with the third segment 34A which form the capacitor element C1 of FIG. 2A. The second trace 28B further comprises a fifth segment 36A and a sixth segment 36B symmetric with the fifth segment 36A which form the capacitor element C2 of FIG. 2A. In the embodiment of FIG. 2B, the width of the segments forming the inductor element is less than the width of the segments forming the capacitor elements.

The traces 28A and 28B shown in FIG. 2B comprise additional symmetrical segments of varying widths to form the remaining capacitor elements C3 and C4 that form the compensation network of FIG. 2A. In one embodiment, the traces 28A and 28B are fabricated such that the compensation network helps to annul the suceptance (the imaginary part of the admittance) in the band occupied by the read/write signal without materially affecting the signal transmission. The "T" network of FIG. 2B may be cascaded if desired to increase the number of capacitor/inductor networks in the compensation network 26.

Figure 3A:
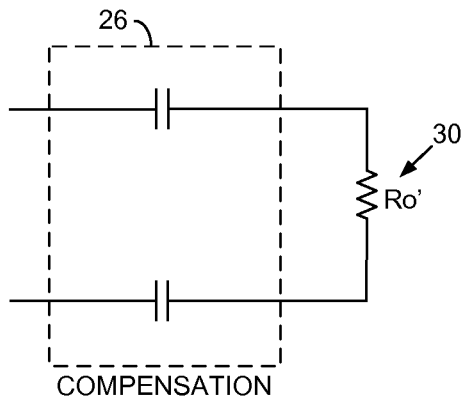
FIG. 3A shows a compensation network according to an embodiment of the present invention comprising two capacitors and a terminating load.
Figure 3B:
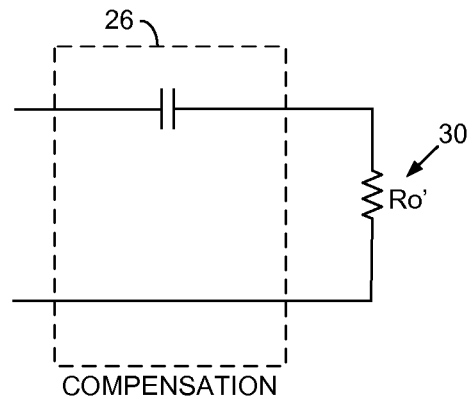
FIG. 3B shows an embodiment of the present invention wherein the two capacitors in the compensation network of FIG. 3A are combined into a single capacitor.
Figure 3C:
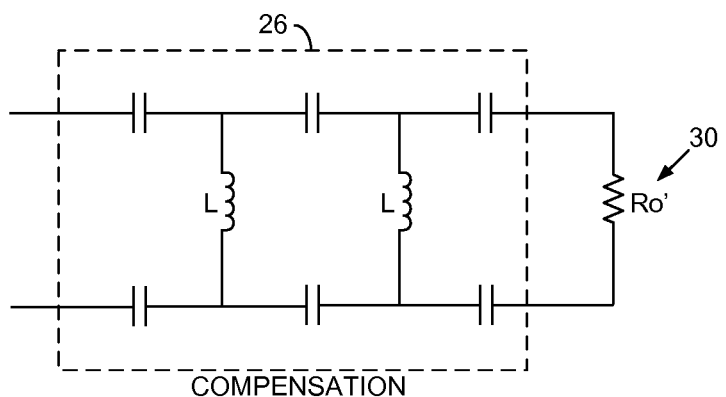
FIG. 3C shows a compensation network according to an embodiment of the present invention comprising an additional capacitor/inductor network.

FIG. 3A shows an alternative embodiment of the compensation network 26 comprising a first and second capacitors connected in series with a terminating load 30. That is, the compensation network may not require an inductor element as in the embodiment of FIG. 2A. In FIG. 3A, since the first capacitor is in series with the terminating load 30 as well as the second capacitor, in an embodiment shown in FIG. 3B the first and second capacitors may be combined into a single capacitor in series with the terminating load 30. A similar modification may be made to the embodiment of FIG. 2A by combining the capacitor C1 with the capacitor C2, wherein the corresponding modification in FIG. 2B would be to short either of the gaps between C1 or C2 and increase the trace width of the remaining capacitor element. In yet other embodiments, the compensation network 26 may comprise one or more additional capacitor/inductor networks, such as shown in the embodiment of FIG. 3C which includes one additional capacitor/inductor network as compared to the embodiment of FIG. 2A.

The compensation network may be fabricated along any part of the interconnect path. In one embodiment, the compensation network 26 may be fabricated on the FPC and/or fabricated with the transmission lines 10A and 10B. In yet another embodiment, all or part of the compensation network 26 may be fabricated with the head 4.

What is claimed is:

1. A disk drive comprising:
a disk;
a head actuated over the disk, the head comprising a read element and a write element;
a preamp; and
an interconnect comprising a first transmission line and a second transmission line coupling the head to the preamp, and a compensation network operable to compensate for an impedance discontinuity in the first and second transmission lines, the compensation network connected in parallel with the first and second transmission lines through first and second traces, wherein a shape of the first and second traces varies to form at least a first capacitor in the compensation network.

2. The disk drive as recited in claim 1, wherein the compensation network further comprises a terminating load in series with the first capacitor.

3. The disk drive as recited in claim 2, wherein a shape of the first and second traces varies to form at least a second capacitor in series with the terminating load.

4. The disk drive as recited in claim 3, wherein a shape of the first and second traces varies to form at least a first inductor in shunt with the terminating load.

5. The disk drive as recited in claim 4, wherein:
the first trace comprises a first segment;
the second trace comprises a second segment symmetric with the first segment;
the first trace comprises a third segment and a fourth segment symmetric with the third segment;
the second trace comprises a fifth segment and a sixth segment symmetric with the fifth segment;
the first and second segment form the inductor;
the third and fourth segments form the first capacitor; and
the fifth and sixth segments form the second capacitor.

6. The disk drive as recited in claim 5, wherein a width of the first and second segments is less than a width of the third and fourth segments.

7. The disk drive as recited in claim 4, wherein a shape of the first and second traces varies to form a third and fourth capacitors.

8. The disk drive as recited in claim 2, wherein the terminating load comprises a resistor.

9. The disk drive as recited in claim 2, wherein a resistance of the terminating load substantially matches a resistance of one of the read element and the write element.

10. The disk drive as recited in claim 1, wherein the shape comprises a width of the first and second traces.

11. The disk drive as recited in claim 1, wherein the first trace is stacked over the second trace.

12. An interconnect for use in a disk drive, the disk drive comprising a head actuated over a disk, the head comprising a read element and a write element, the interconnect comprising:
a first transmission line and a second transmission line operable to couple the head to a preamp; and
a compensation network operable to compensate for an impedance discontinuity in the first and second transmission lines, the compensation network connected in parallel with the first and second transmission lines through first and second traces, wherein a shape of the first and second traces varies to form at least a first capacitor in the compensation network.

13. The interconnect as recited in claim 12, wherein the compensation network further comprises a terminating load in series with the first capacitor.

14. The interconnect as recited in claim 13, wherein a shape of the first and second traces varies to form at least a second capacitor in series with the terminating load.

15. The interconnect as recited in claim 14, wherein a shape of the first and second traces varies to form at least a first inductor in shunt with the terminating load.

16. The interconnect as recited in claim 15, wherein:
the first trace comprises a first segment;
the second trace comprises a second segment symmetric with the first segment;
the first trace comprises a third segment and a fourth segment symmetric with the third segment;
the second trace comprises a fifth segment and a sixth segment symmetric with the fifth segment;
the first and second segment form the inductor;
the third and fourth segments form the first capacitor; and
the fifth and sixth segments form the second capacitor.

17. The interconnect as recited in claim 16, wherein a width of the first and second segments is less than a width of the third and fourth segments.

18. The interconnect as recited in claim 15, wherein a shape of the first and second traces varies to form a third and fourth capacitors.

19. The interconnect as recited in claim 13, wherein the terminating load comprises a resistor.

20. The interconnect as recited in claim 13, wherein a resistance of the terminating load substantially matches a resistance of one of the read element and the write element.

21. The interconnect as recited in claim 12, wherein the shape comprises a width of the first and second traces.

22. The interconnect as recited in claim 12, wherein the first trace is stacked over the second trace.

23. A method of manufacturing an interconnect for use in a disk drive, the disk drive comprising a head actuated over a disk, the head comprising a read element and a write element, the method comprising:

fabricating a first transmission line and a second transmission line operable to couple the head to a preamp; and fabricating a compensation network operable to compensate for an impedance discontinuity in the first and second transmission lines, the compensation network connected in parallel with the first and second transmission lines through first and second traces, wherein a shape of the first and second traces varies to form at least a first capacitor in the compensation network.

\* \* \* \* \*